Feb. 19, 1952 W. H. PETIT 2,586,708
TORQUE TESTING INSTRUMENT FOR SELF-LOCKING NUTS, ETC
Filed March 7, 1949 4 Sheets-Sheet 1

FIG.1.

INVENTOR.
WILLIAM H. PETIT
BY
ATTORNEY

Feb. 19, 1952 W. H. PETIT 2,586,708
TORQUE TESTING INSTRUMENT FOR SELF-LOCKING NUTS, ETC
Filed March 7, 1949 4 Sheets-Sheet 2

INVENTOR.
WILLIAM H. PETIT
BY
Fred N. Schwend
ATTORNEY

Feb. 19, 1952 W. H. PETIT 2,586,708
TORQUE TESTING INSTRUMENT FOR SELF-LOCKING NUTS, ETC
Filed March 7, 1949 4 Sheets-Sheet 4

INVENTOR.
WILLIAM H. PETIT
BY
ATTORNEY

Patented Feb. 19, 1952

2,586,708

UNITED STATES PATENT OFFICE 2,586,708

TORQUE TESTING INSTRUMENT FOR SELF-LOCKING NUTS, ETC.

William H. Petit, Pasadena, Calif., assignor to Clary Multiplier Corporation, Los Angeles, Calif., a corporation of California Application March 7, 1949, Serial No. 79,945

13 Claims. (Cl. 73—99)

This invention relates to an instrument for testing and recording the torque developed between relatively rotatable elements, such as threaded connections, and has particular reference to an instrument for testing the gripping or locking characteristics of self-locking nuts.

The majority of self-locking nuts rely for their locking effectiveness upon their ability to frictionally grip the screw or bolt upon which they are threaded. A well known example of such a lock-nut is the so-called elastic stop-nut which carries a fiber ring having an internal bore of such diameter that it will frictionally grip a bolt threaded into the nut, and it is desirable that the gripping or self-locking characteristics be held within certain maximum limits. If the gripping action is insufficient, the self-locking ability of the nut will likewise be insufficient, whereas if the gripping action is excessive, the nut will be difficult to apply or remove and the locking portion thereof as well as the threads may be destroyed or damaged. Again, it is generally desirable that the nut retain its self-locking characteristics after it has been applied and removed a number of times.

Because of manufacturing tolerances and variations in the characteristics of the materials used in making nuts of the foregoing type, the self-locking characteristics are subject to variations which may exceed the aforementioned maximum limits. Again, the fiber or other non-metallic material of the nuts using such material as the locking medium, is effected by age, temperature, humidity conditions, etc., particularly after being stored or in use for a relatively long period of time.

In certain cases, it is absolutely necessary in the interests of safety that self-locking nuts satisfy certain specified exacting requirements to prevent them from loosening under the action of vibration, temperature changes, jars, etc. Also, as in the case of self-locking nuts furnished for use by the military forces, adequate records of the locking characteristics of sample nuts taken from different lots must be kept and furnished to government inspectors or others when required.

It therefore becomes the principal object of the present invention to record the locking characteristics of a nut of the foregoing type and to eliminate the chance of error on the part of either the testing device or the operator.

Another object is to provide a nut testing device whose accuracy may be easily and readily checked and verified at any time.

Another object is to provide a nut testing instrument which will make separate autographic records indicating the magnitude of the gripping action of a nut of the above type during a series of complete installations and removals of a bolt therein.

The manner in which the above and other objects of the invention are accomplished will be readily understood on reference to the following specification when read in conjunction with the accompanying drawings wherein.

Figures 4, 5, 6:
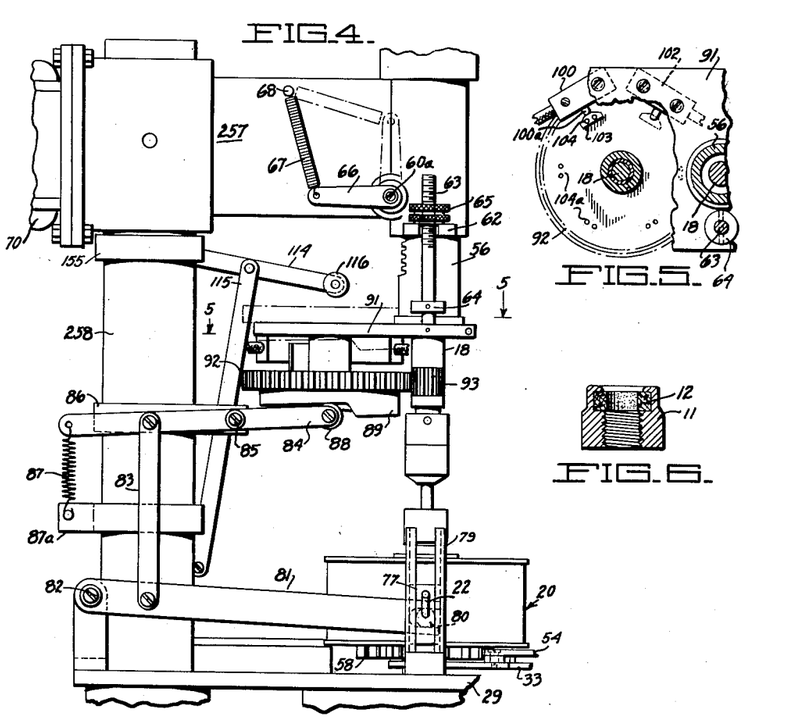
Fig. 4 is a left side elevation view with parts broken away.
Fig. 5 is a sectional plan view taken substantially along the line 5—5 of Fig. 4, showing the limit switch control mechanism.
Fig. 6 is a sectional view through a typical self-locking nut which can be tested by the instrument of the present invention.

The instrument of the present invention is primarily intended to test self-locking nuts of the type shown in Fig. 6. Such a nut comprises a threaded metallic body 11 having a socket in which is securely mounted a ring 12 of non-metallic material, such as fiber, capable of resiliently and frictionally gripping a bolt as it is threaded through the nut. However, other types of threaded connections and self-locking nuts may be equally well tested.

Figure 9:
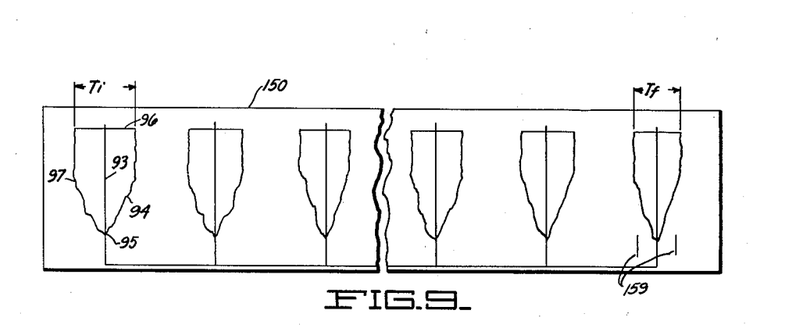
Fig. 9 illustrates a strip of paper on which has been recorded a series of graphs indicating the magnitude of torque developed during a series of installations and withdrawals of a bolt into a nut being tested.

Describing the instrument in general, and in connection with the testing of a nut 15 (Fig. 1) of the type shown in Fig. 6, the nut is first threaded by hand in an inverted position onto a specimen bolt 16 until the bolt just touches the fiber locking ring within the nut. The bolt is mounted in a suitable holder or clutch 17 carried by a power rotated spindle 18 which is then lowered by the operator until the nut fits within a socket in a nut holder 19. The latter is normally connected, in a manner to be described in detail later to both a recording drum 20 and a weight arm or pendulum 21. The spindle 18 is rotated to drive the bolt through the locking ring of the nut, and the ensuing torque developed between the nut and the bolt is transmitted to both the drum 20 and weight arm 21, rotating the drum relative to a scribing pen 22 (Figs. 2, 3 and 4) in accordance with the magnitude of the torque developed. The pen 22 is guided for vertical movement and so moves in timed relation with the axial movement of the bolt 16 into the nut. Thus, a graph is recorded on a strip of paper applied to the periphery of the drum, or on the periphery itself, to indicate coordinately the magnitude of the torque at different points during the entry of the bolt into the locking ring. After complete installation of the bolt in the nut, the spindle 18 is reversed, withdrawing the bolt. Therefore, a complete graph is made, as illustrated in Fig. 9, showing the magnitude of the torque developed between the parts. The present machine is arranged to automatically rotate the bolt five turns during installation and then five turns during the withdrawal process to insure complete traverse of the bolt through the locking ring.

Figure 7:
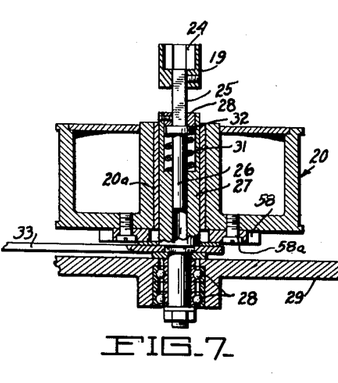
Fig. 7 is a sectional view through the recording drum and is taken substantially along the line 7—7 of Fig. 1.

The holder 19 has a socket 24 (Fig. 7) of such configuration as to slidably receive the nut, but to prevent relative rotation therebetween. The holder is suitably secured to the upper square shank 25 of a rod 26. The latter is slidably mounted in a hollow shaft 27 suitably mounted in ball bearings 28 carried by a plate member 29 suitably attached to and forming part of a base 30 (Fig. 1) of the instrument.

In order to permit axial movement of the rod 26 and at the same time prevent relative movement between the same and the shaft 27, the square shank 25 of the former is slidably fitted in a square opening in the collar 28 secured to the upper end of the shaft 27. The holder 19 is yieldably held in its upper position illustrated in Fig. 7 by a spring 31 mounted in a counter-bored portion of the shaft 27 and engaging a collar 32 secured to the rod 26.

Figure 1:
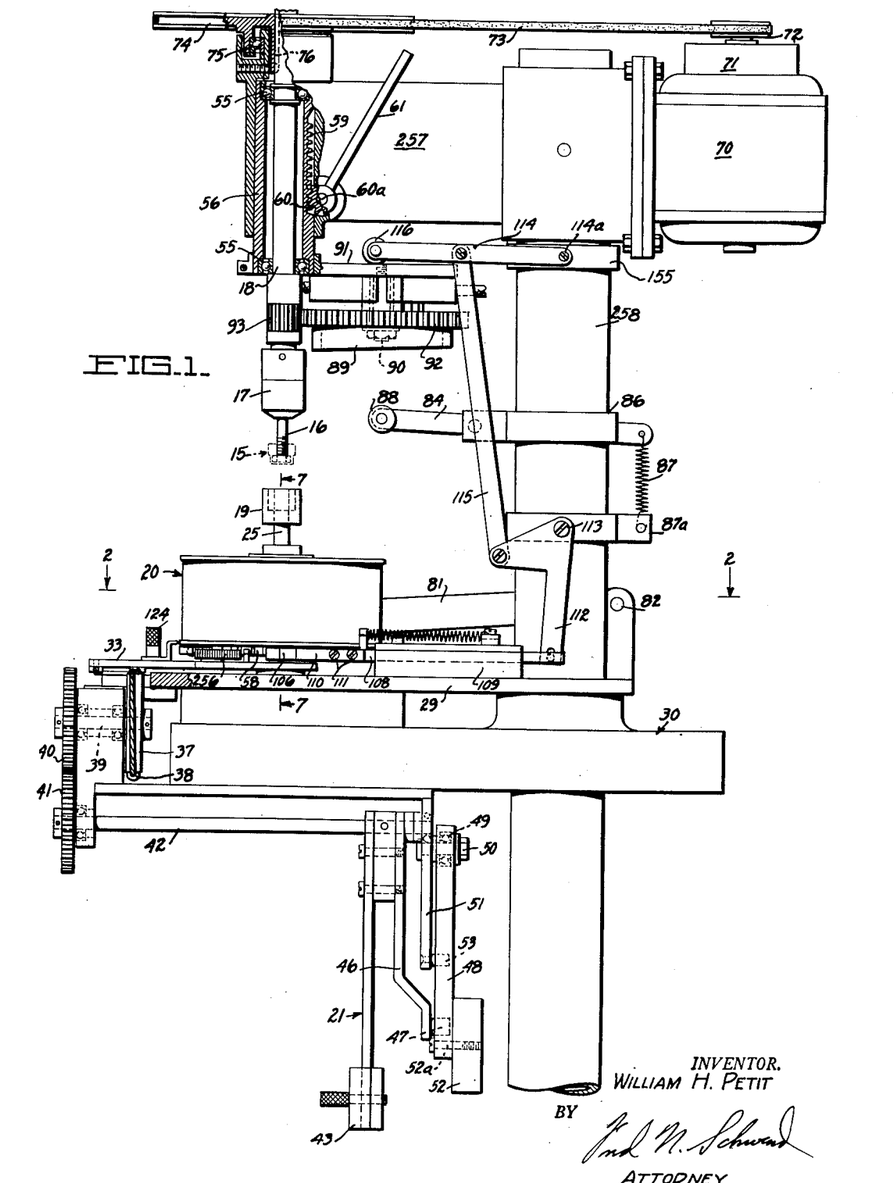
Fig. 1 is a right side elevation view, partly in section, of a torque testing instrument embodying the present invention.

In order to operate the weight arm 21, an arm 33 is securely attached to the shaft 27 and is pivotally attached at its outer end to a cable coupling 34 (Fig. 2) in which are fastened the ends of a flexible cable or cord 35. The latter is reeved over pulleys 36 rotatably carried by brackets 123 on the plate 29 through suitable anti-friction bearings. The central portion of the cable is wrapped one or more times over a drum 37 and is suitably attached thereto at a mid-point 38 (Fig. 1). The drum 37 is connected through shaft 39, intermeshing gears 40 and 41 and shaft 42 to the weight arm 21 which is fastened to the latter shaft. The bearings for shafts 39 and 42 are preferably of the anti-friction type to reduce to a minimum the friction in the weight arm drive system.

The weight arm 21 carries a weight 43 slidable therealong and arranged to be fixed in any of several positions by a pin 44 which can be inserted into any of a series of holes 45 (Fig. 3) spaced along the weight arm to thereby vary the moment arm of the weight arm system. In fact, where a very small moment arm is desired, the weight 43 may be removed entirely.

Also, securely attached to the weight arm 21, and forming part thereof, is an arm 46 (Fig. 1) carrying a stud 47 which, when the arm 21 is swung a certain angular amount picks up one or the other of two auxiliary weight arms or pendulums 48, the purpose of which will appear later. The latter are located on opposite sides of the main weight arm or pendulum 21 and are pivotally mounted through anti-friction bearings 49 upon bolts 50 extending from a vertical plate 51 suitably attached to the base 30. The auxiliary weight arms 48 carry weights 52 which may be attached at different positions along the arms by bolts 52a. The arms normally rest on studs 53 extending from the plate 51.

The drum 20 is rotatably mounted on the shaft 27, coaxially therewith, by means of a bearing 20a but is normally movable as a unit with the shaft 27 and arm 33 by means of a detent 54 (Fig. 2) pivoted to the latter at 255. A spring 256 extends between the arm and the detent to hold the nose 57 on the detent in engagement with one of a series of spaced notches formed on a ratchet element 58 which is secured by bolts 58a (Fig. 7) to the bottom of the drum 22. This arrangement, however, permits the drum to be indexed into sixteen angular positions relative to the arm 33 as will be described hereinafter so as to permit recording of a number of separate graphs on the drum.

The power driven spindle 18 carrying the specimen bolts is rotatably carried in bearings 55 mounted at opposite ends of a quill 56. The latter is slidable axially in a bore formed in a spindle head 257 which is rigidly mounted on a post 258, the latter also supporting the base 30 and thus comprising part of the main frame of the instrument. Suitable means, not shown, are provided to prevent rotation of the quill 56.

Rack gear teeth 59 are formed on the quill 56 and mesh with a pinion 60 fixed on a pinion shaft 60a rotatably mounted in the head 257. A handle 61 is secured to the pinion shaft 60a, permitting the operator, by rotating the handle, to lower the quill to carry the chuck 17 and bolt 16 from an inoperative position, shown in Fig. 1, to an operative position, shown in Fig. 4, wherein the nut 15 is inserted in the socket of holder 19 preparatory to the testing operation.

In order to limit the spindle 18 in either its upper inoperative or loading position of Fig. 1 or its lower operative or testing position of Fig. 4, a limit stop is provided, comprising lugs 62 (Fig. 4) extending from the spindle head 257 and embracing a vertical rod 63 carried at its lower end by the quill 56. An upper limit collar 64 is secured to the rod and a lower limit stop is provided comprising lock nuts 65 screw threaded on the upper end of the rod and adjustable therealong to enable adjustment of the lower limit of the spindle.

Means are provided for holding the spindle in either its upper or its lower limit position and comprises an arm 66 (Fig. 4) fastened to the pinion shaft 60a. The arm 66 is connected to one end of an over-center spring 67 which is attached at its opposite end to a stud 68 mounted on the spindle head 257. As the pinion 60 is rotated to move the spindle between its upper and lower positions the spring 67 passes over center and thereby normally maintains the spindle in either of its two extreme positions.

The spring 67 is somewhat stronger than spring 31 (Fig. 7) which supports the holder 19, and in practice, the lower limit adjusting nuts 65 are preferably so adjusted that when the spindle 18 is moved to its lower position at the start of a testing operation, the nut 15 will depress holder 19 a certain amount against the action of spring 31. As the bolt is thereafter threaded into the locking ring of the nut, the holder 19 will move upward, following this axial entry of the bolt into the nut. However, the nut may also, if necessary, slide along the socket in holder 19 after the holder reaches its uppermost position.

Spindle 18 is rotated under power by a reversible electric motor 70 suitably mounted on the spindle head 257. The motor operates through a suitable speed reduction unit 71 to rotate a drive pulley 72. The latter is connected by a belt 73 to a pulley 74 mounted on bearings 75 carried by the spindle head 257. The pulley 74 is splined at 76 to the upper end of the spindle 18, permitting vertical movement of the latter but at all times effecting the driving connection therewith. The aforementioned drive connections between the motor and the spindle 18 are so arranged that the bolt is rotated at a relatively slow speed in order to prevent undue heating of the bolt and nut due to the frictional engagement between the two which might result in consequent error in torque characteristics.

The scribing pen 22 may be of any desired construction and is slidably mounted for lengthwise movement in a carrier or support 77. The pen is urged by a compression spring 78 against the periphery of the drum 20 or against a strip of paper suitably attached to said periphery. The holder 77 has vertical guide slots along the sides thereof which are engaged by channel members 79 suitably attached to the base plate 29 to guide the pen in a vertical direction.

Means are provided for moving the pen 22 vertically in timed relation with the axial movement of the bolt into the nut being tested and for this purpose, the pen holder 77 is provided with a circular groove 80 (Fig. 3) embraced by the forked ends of a lever 81. The latter is fulcrumed at 82 and connected by a link 83 (Fig. 4) to a cam follower lever 84. This latter lever is fulcrumed at 85 on a bracket 86, suitably attached to the post 258, and is urged counter-clockwise by a spring 87 extending between the lever and a fixed bracket 87a on the post to maintain a cam follower roller 88 thereon in contact with a pen control cam 89 during the testing operation.

The cam 89 is rotatably mounted on a stud 90 (Fig. 1) extending downward from a bracket 91 which is suitably secured to the spindle quill 56 and thus moves vertically therewith. A gear 92, forming part of the cam 89, meshes with the gear 93 formed on the spindle 18 to transmit rotation to the cam 89. The gear 92 is six times the diameter of the gear 93.

The camming surface of cam 89 has a constant rise and therefore when the spindle is lowered to its position shown in Fig. 4, the cam will engage the cam follower roller 88, and during the ensuing rotation of the spindle 18, the cam 89 will transmit a vertical movement to the pen 22 in direct relation to the axial movement of the bolt into the nut, during both installation and removal of the bolt. Later, when the spindle 18 is raised to remove the nut from the holder 19, the cam 89 recedes from the cam follower roller 88 and thus has no control thereover when the spindle is in its upper position.

Fig. 9 shows a graph strip 150 on which a series of graphs are made by the present instrument. Each graph is made in relation to a vertical ordinate or zero torque line 93 scribed by the operator while the instrument is at rest and free of any torque conditions by manually actuating the cam follower lever 84 to raise the pen vertically in a straight line motion.

Figure 2:
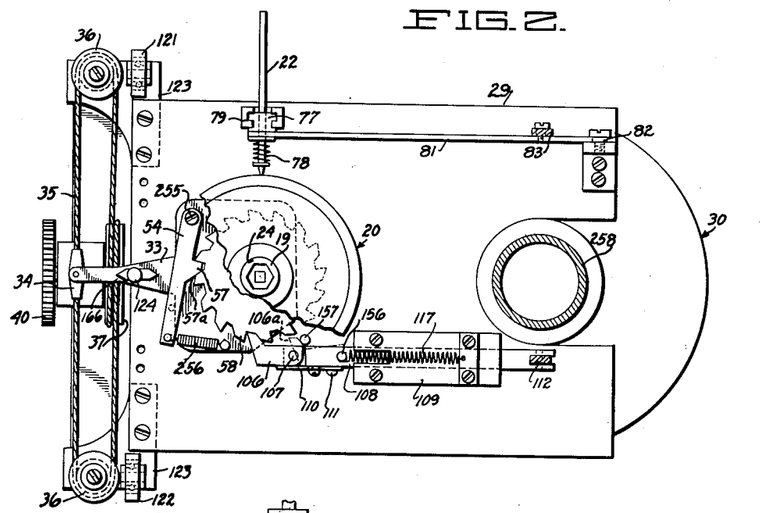
Fig. 2 is a sectional plan view of the instrument and is taken substantially along the line 2—2 of Fig. 1.
Figure 3:
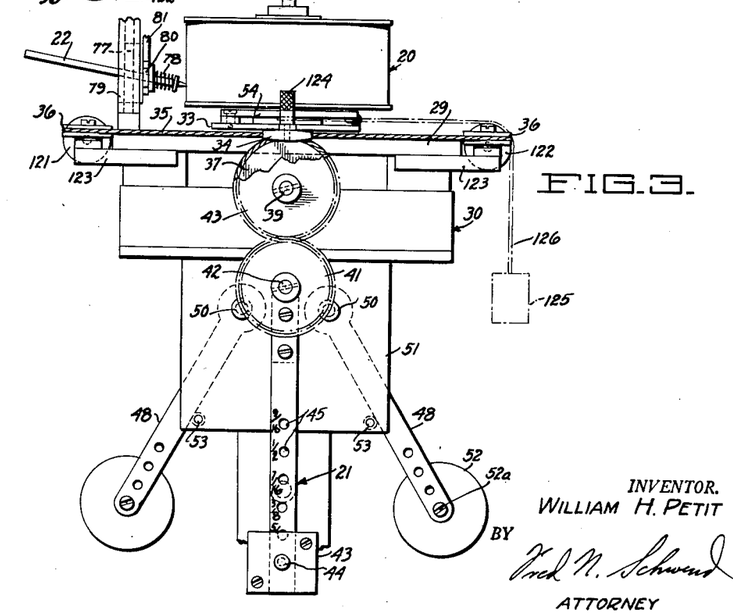
Fig. 3 is a front view of the main portion of the instrument.

In the operation of the machine, and as the bolt enters the locking ring of the nut being tested, the ensuing torque (assuming the bolt to have right hand threads) will move the drum and strip, i. e., 150 attached thereto, clockwise as viewed in Fig. 2, to scribe the right hand torque indicating line 94, starting at the point 95. After five rotations of the spindle 18 and bolt 16, the operator reverses the direction of rotation of the motor in a manner to be described later, to withdraw the bolt from the nut. As the direction of torque is reversed, and before actual withdrawal of the bolt, the drum 20 will swing from one extreme position to the other, causing the pen 22 to scribe the upper horizontal line 96, passing across the median or zero torque line 93. As the bolt withdraws from the locking ring of the nut, the left hand graph 97 is scribed, arriving at the starting point 95 wherein the bolt is completely removed from the fiber ring. The resulting graph gives a complete and easily understood indication of the magnitude of the torque during all points of installation and withdrawal of the bolt.

The instrument of the present invention is intended to record a wide range of different sizes of lock-nuts having a wide range of torque characteristics and at the same time adequately record the amplitude of both very small torque forces as well as relatively large torque forces. For this reason, the moment arm of the weighted arm 21 is adjustable as mentioned heretofore. In order to facilitate adjustment of the weight 43 along the arm 21, indicia are marked on the arm adjacent the holes 45 to indicate the position of the weight 43 when testing different size nuts. Further, the range of movement of the weight system is divided into three parts: a central range being traversed solely by the arm 21 when recording relatively light torque forces, and the two outer ranges in which one or the other of the auxiliary weight arms 48 is also moved by the arm 21. Therefore, the outer ranges of movement have less amplitude of movement per unit of torque and permit the recording of a relatively high magnitude of torque.

Figure 8:
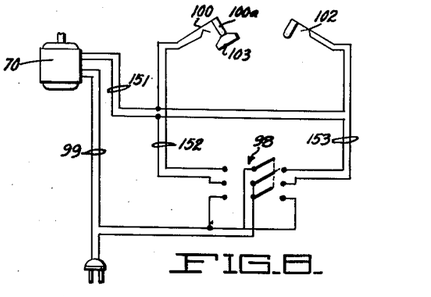
Fig. 8 is a schematic view illustrating the electrical circuit connections for the driving motor.

Means are provided to facilitate control of the motor 70 during a nut testing operation. Referring in particular to the motor circuit shown in Fig. 8, the motor may be of any reversible type including power supply leads 99 and reversing leads 151 arranged to be connected in either of two relationships to the power leads to effect rotation of the motor in either of two directions. For the latter purpose a three pole, double throw reversing switch 98 is provided. A pair of leads 152 are connected to two of the switch terminals on one side of the switch 98 and are placed in series with a normally closed limit switch, generally indicated at 100, and are connected across the reversing leads 151. A second pair of leads 153 are connected to two of the switch terminals on the opposite side of the switch 98 and are placed in series with a second normally closed limit switch, generally indicated at 102, and are connected across the reversing leads 151 in an opposite sense to the leads 152. The lower third pole of the switch 98 is connected in circuit with the power supply leads 99 to close the motor circuit whenever the switch is thrown to either of its closed positions.

The limit switches 100 and 102 are both mounted on the bracket 91 (see Figs. 1 and 5) in operative relation to a switch operating cam 103 carried by the cam gear 92. The cam 103 is attached by means of pins 104 to the gear 92 and when the spindle 18 is in its normal position of rest, as shown in Figs. 1 and 5, the cam 103 will engage the plunger 100a of the switch 100, holding the same open, while the switch 102 is allowed to remain closed. Therefore, in order to energize the motor, the switch 98 must be thrown to the right to complete the motor circuit through leads 153, causing the motor to rotate in a direction to drive the spindle 18 clockwise to install the bolt in the test nut. After approximately five rotations of the spindle 18, the cam 103 will open the switch 102, arresting the motor and requiring the operator to throw the switch 98 to the opposite side to complete the motor circuit through leads 152 and thus effect rotation of the motor in the opposite direction to withdraw the bolt. After five rotations in the latter direction, the cam 103 will again open the switch 100 bringing the motor to rest.

Sets of holes 104a are equally spaced about the gear 92 to permit the attachment thereto of a second cam (not shown), identical to the cam 103, in any of four positions whereby to open the switch 102 after any number of rotations of the spindle 18 less than five.

As described hereinbefore, it is desirable, and in some cases required, to record the torque characteristics involved during a series of successive installations and withdrawals of the nut and bolt, and for this purpose, means are provided to index the drum 20 to a new position relative to the pen 22 after each complete installation and withdrawal so that an entirely separate and new graph may be recorded.

Referring to Fig. 2, a pawl 106 is provided for indexing the ratchet 58 and drum 20 connected thereto into sixteen different angularly spaced positions. The pawl is pivotally carried at 107 on a slide 108 slidably mounted for longitudinal movement in a bearing block 109 attached to the base plate 29. A leaf spring 110 is secured by screws 111 to the slide 108 and engages the pawl 106 to yieldably hold the same in engagement with the ratchet 58.

As shown in Fig. 1, the slide 108 is connected by a bellcrank 112, fulcrumed at 113, and a link 115 to an arm 114. The arm 114 is pivoted at 114a on a bracket 155 fixed on the post 258 and is provided with a roller 116 arranged to be engaged by the upper surface of the bracket 91 which it will be recalled is carried by the quill 56 as the latter is moved up and down between its loading and testing positions.

When the quill 56 is in its upper loading position, spring 67 (Fig. 4) is effective to hold the pawl 106 and linkage connected thereto in their forward positions shown in Fig. 2 against the action of a spring 117 tensioned between a pin 156 on the slide 108 and a portion of the bearing block 109. However, as the operator lowers the spindle 18 to insert a nut to be tested into the holder 19, the bracket 91 will, of course, move down along with the spindle, allowing the spring 117 to retract the pawl 106 into its dot-and-dash positions 106a wherein it is cammed by a stationary pin 157 into a location free of the ratchet 58.

After installation and withdrawal of the bolt into the test nut, the operator will raise the spindle 18 by manipulation of the handle 61, causing the bracket 91 to raise the arm 114 which, through link 115 and bellcrank 112, will force the slide 108 forward, causing the pawl 106 to engage and rotate the ratchet 58 and drum 20 one space or increment. It will be noted that the face 57a of the detent nose 57 and the corresponding engaging faces of the notches in the ratchet 58 are inclined sufficiently to permit the ratchet teeth to rasp over the detent nose as the ratchet and drum are advanced from one position to another. However, as the ratchet reaches its new position, the detent 54 will engage the next ratchet notch. As the operator again lowers the spindle to insert the nut into the holder 19, the the pawl 106 will be retracted to a new position out of cooperative relation with the ratchet so as to not interfere with movement of the drum.

As a consequence of the aforementioned indexing of the drum 20 during a series of installations and withdrawal tests of a sample nut, a series of graphs similar to those shown in Fig. 9 will result. It will be noted that, as would be expected, the magnitude of the torque ($Ti$) developed during the initial installation and as shown in the left hand graph of Fig. 9 is greater than the magnitude of the torque ($Tf$) developed during the final installation as shown in the right hand graph.

The operator may, if he desires, index the drum 20 from any position to any other position by raising and lowering the spindle 18 in the aforementioned manner the desired number of times while the motor switch 98 is in open position. Alternatively, he can set the drum in any position by rotating the same manually in a clockwise direction relative to the detent 54 until the desired position is reached.

In testing a nut, certain torque limits are of importance and the torque must not exceed such limits. For example, government specifications for a one-half inch diameter nut of the foregoing type having twenty threads per inch require that the maximum torque developed at any time in either installation or removal must not exceed 150 inch pounds. Also, the minimum prevailing torque (exclusive of starting) during the first withdrawal of the bolt from the test nut must not at any time fall below 21.8 inch pounds and during the final or fifteenth removal it must not fall below 10.3 inch pounds.

Having before him the graph strip 150, the operator proceeds to check the graph to determine if such limits have been exceeded. This is done by applying a scale 120 (Fig. 10) which has been especially prepared for the particular size nut being tested. The scale is preferably made of transparent plastic or the like and has scribed therein a median or zero torque line 158 and additional lines to indicate the aforementioned limits. The latter lines are provided on opposite sides of the zero line to check the torque characteristics during both installation and withdrawal. By applying the scale 120 over one of the graphs on the strip 150 and locating the zero line 158 in registry with the zero line 93 of the graph, the operator or inspector may readily determine if the specified torque limits have been exceeded. In order to calibrate such scales as that shown at 120, rollers 121 and 122 (Figs. 2 and 3) are rotatably mounted on anti-friction bearings carried by bearing brackets 123. The rollers 121 and 122 are arranged in line with a knob 124 secured to the torque arm 33 and during a calibrating operation a weight indicated by the dot-and-dash lines 125 is suspended by means of a cord 126 passing over one or the other of the rollers and attached at its free end to a knob 124.

In calibrating the scale, for the particular nut to be tested, the scale is attached to the drum 20 and a suitable weight 125 is selected which will give a particular limit reading to be marked on the scale. For example, if the distance between the center of the drum 20 and the knob 124 is equal to four inches and it is desired to calibrate the scale 120, weights would be selected which would provide moment arms of 10.3 inch pounds, 21.8 inch pounds and 150 inch pounds, such weights being $$\frac{10.3}{4}=2.57 \text{ pounds}, \frac{21.8}{4}=5.45 \text{ pounds}$$

and $$\frac{150}{4}=37.50 \text{ pounds}$$

respectively. With the instrument in balance, without the bolt or test nut in place and without the weight 125 applied, the operator will cause the pen 22 to scribe the zero line 158 by manually actuating the linkage connected thereto. Thereafter, one of the weights will be hung over one of the rollers, i. e., 122 to deflect the drum 20 accordingly and, when the parts are in balance, the operator will raise the pen, scribing a line which will thereafter be marked to indicate the corresponding torque. After the torque limits corresponding to all of the weights have been scribed on the scale, the weights are hung in succession over the opposite roller 121 to deflect the drum in the opposite direction whereby to scribe the torque limits on the opposite side of the zero reference line 158.

It may be desirable at times to calibrate the torque limits directly on the graph strip 150 of Fig. 9, in which case, either before or after the torque characteristics for the particular nut being tested is recorded, the various selected weights are hung in succession over the rollers 121 and 122 and the corresponding limit lines scribed directly on the graph strip as at 159.

Figure 10:
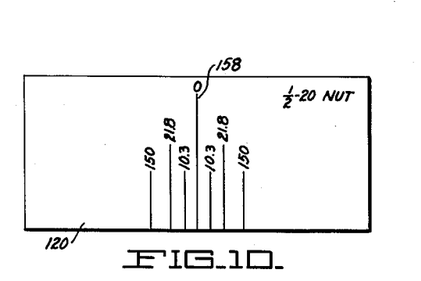
Fig. 10 illustrates a suitable scale for checking a graph made by the instrument for a particular size nut.
Figure 11:
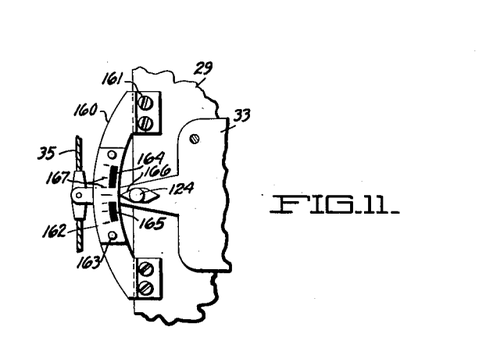
Fig. 11 is a fragmentary plan view, similar to that of Fig. 2, showing an attachment for visually indicating the torque limits for a particular nut being tested.

Fig. 11 illustrates a visual torque limit indicator comprising an arcuate piece 160 attached by screws 161 to the top surface of the base plate 29. A scale 162 is removably attached by pins 163 to the central portion of the piece 160 and has provided thereon two torque range marks 164 and 165 which indicate, for a particular type and size nut, the maximum and minimum torque allowable. A pointer 166 is fastened to the arm 33 and is located directly adjacent the scale 162 whereby the operator may be visually apprised at all times of the torque conditions existing in the nut being tested. Additional scale marks 167 correspond to the marks on the scale 120 (Fig. 10).

The foregoing visual indicator may be used to supplement the autographic device comprising the pen 22, etc., or, in cases where it is not necessary to obtain a graphic record of the torque characteristics of a nut to be tested, the visual indicator may supplant entirely the autographic device.

It will be apparent from the foregoing description that the instrument of the present invention provides, by means of the particular system disclosed, for the absolute measurement of the torque characteristics of two parts in screw threaded relationship with each other, in contra- distinction to other systems which embody springs and other resilient elements to effect torque measurement. It will also be seen that the present invention provides a ready and fool proof measure for checking the instrument, scales, records, etc., at any time whereby the accuracy and authenticity of graphic records produced by the instrument may be verified.

Having thus described my invention, what I desire to secure by United States Letters Patent is:

1. In a device for testing nuts and the like; the combination comprising a holder for a nut, a holder for a screw member to be threaded into said nut, means supporting said holders for relative rotation and for relative axial movement in relation to each other whereby to enable said screw member to be threaded into and out of said nut, a support for a record material, a support for maintaining a scriber in scribing relation to the record material, means comprising a cam device moved in accordance with the relative movement of said screw member into and out of said nut and a cam follower device operatively connected to one of said supports for causing relative movement of said supports in one direction in timed relation to the movement of said screw member into said nut and for causing relative movement of said supports in an opposite direction in timed relation to the movement of said screw member out of said nut, and means responsive to the torque developed between said nut and said screw member during movement of said screw member into said nut for causing relative movement of said supports in a third direction by an amount indicative of the magnitude of said torque, said last mentioned means being responsive to torque development between said nut and said screw member during movement of said screw member out of said nut for causing said relative movement of said supports in a direction opposite to said third direction by an amount indicative of the magnitude of said last mentioned torque.

2. In a device for measuring the torque required to rotate one part in screw threaded relation to another part; the combination of a first holder for one of said parts, a second holder for the other of said parts, means for rotating said first holder, a swingable weighted arm normally held in a vertical position by gravity, means operatively connecting said second holder to said weighted arm whereby to move said arm away from the vertical by an amount proportional to the torque applied to said second holder, a drum support for record material, said drum support being directly connected to said second holder for rotation in unison therewith, a support for maintaining a scriber in scribing relation to said record material, means operable by said rotating means for causing relative movement of said supports in a direction parallel to the axis of rotation of said drum support.

3. In a device for measuring the torque required to rotate one part in screw threaded relation to another part during installation and withdrawal thereof; the combination of a first holder for one of said parts, a second holder for the other of said parts, means for rotating said first holder, a swingable weighted arm normaly held in a vertical position by gravity, means operatively connecting said second holder to said weighted arm whereby to move said arm away from the vertical by an amount proportional to the torque applied to said second holder, a support for record material, a support for maintaining a scriber in scribing relation to said record material, means operable by said rotating means for causing relative movement of said supports in one direction during installation of said parts and in the opposite direction during withdrawal thereof, means operable by said second holder during installation of said parts for causing relative movement of said supports in a third direction at right angles to said first two mentioned directions, said last mentioned means being operable by said second holder during withdrawal of said parts for causing relative movement of said supports in a direction opposite to said third direction.

4. In a device for measuring the torque required to rotate one part in screw threaded relation to another part; the combination of a first holder for one of said parts, a second holder for the other of said parts, means for rotating said first holder, a swingable weighted arm normally held in a vertical position by gravity, means operatively connecting said second holder to said weighted arm whereby to move said arm away from the vertical by an amount proportional to the torque applied to said second holder, an auxiliary swingable weighted arm, means operable by said first mentioned arm only after a predetermined movement thereof away from the vertical for moving said auxiliary arm, a support for record material, a support for maintaining a scriber in scribing relation to said record material, means operable by said rotating means for causing relative movement of said supports in one direction, and means operable by said second holder in response to torque transmitted thereto for causing relative movement of said supports in a second direction at right angles to said first mentioned direction.

5. In a device for measuring the torque required to rotate one part in screw threaded relation to another part; the combination of a first holder for one of said parts, a second holder for the other of said parts, means for rotating said first holder, a swingable weighted arm normally held in a vertical position by gravity, means operatively connecting said second holder to said weighted arm whereby to move said arm away from the vertical by an amount proportional to the torque applied to said second holder, a pair of auxiliary swingable weighted arms, means operable by said first mentioned arm only after predetermined movement thereof away from the vertical in one direction for moving one of said auxiliary arms, said last mentioned means being operable by said first mentioned arm only after a predetermined movement thereof away from the vertical in the opposite direction for moving the other of said auxiliary arms, a support for record material, a support for maintaining a scriber in scribing relation to said record material, means operable by said rotating means for causing relative movement of said supports in one direction, and means operable by said second holder in response to torque transmitted thereto for causing relative movement of said supports in a second direction at right angles to said first mentioned direction.

6. In a device for measuring the torque required to rotate one part in screw threaded relation to another part during installation and withdrawal thereof; the combination of a first holder for one of said parts, a second holder for the other of said parts, means for rotating said first holder, a swingable weighted arm normally held in a vertical position by gravity, means operatively connecting said second holder to said weighted arm whereby to move said arm away from the vertical by an amount proportional to the torque applied to said second holder, a pair of auxiliary swingable weighted arms, means operable by said first mentioned arm only after a predetermined movement thereof away from the vertical in one direction during installation of said parts for moving one of said auxiliary arms, said last mentioned means being operable by said first mentioned arm only after a predetermined movement thereof away from the vertical in the opposite direction during withdrawal of said parts for moving the other of said auxiliary arms, a support for record material, a support for maintaining a scriber in scribing relation to said record material, means controlled by said rotating means for causing relative movement of said supports in a certain direction during installation of said parts and in the opposite direction during withdrawal thereof, means operable by said second holder during installation of said parts for causing relative movement of said supports in a third direction at right angles to said first two mentioned directions, said last mentioned means being operable by said second holder during withdrawal of said parts for causing relative movement of said supports in a direction opposite to said third direction.

7. In a device for measuring the torque required to rotate one part in screw threaded relation to another part; the combination of a first holder for one of said parts, a second holder for the other of said parts, means for rotating said first holder, means for yieldably reacting against torque applied to said second holder, a support for record material, a support for maintaining a scriber in scribing relation to said record material, means operable by said rotating means for causing relative movement of said supports in one direction, means operable by said second holder in response to torque transmitted thereto for causing relative movement of said supports in a second direction at right angles to said first mentioned direction, a device for moving one of said holders from an operative to an inoperative position relative to the other of said holders, and means operable by said device for indexing said record material support relative to said scriber support from one recording station to another.

8. In a device for measuring the torque required to rotate one part in screw threaded relation to another part; the combination comprising a first holder for one of said parts, a second holder for the other of said parts, means for rotating said first holder, means for yieldably reacting against torque applied to said second holder, a cylindrical drum for supporting record material, means rotatably supporting said drum, a device directly connecting said drum to said second holder to move in unison therewith, a carrier for maintaining a scriber in scribing relation to the periphery of said drum, and a device for moving said carrier along the length of said drum in timed relation to the relative axial movement of said parts.

9. In a device for measuring the torque required to rotate one part in screw threaded relation to another part; the combination comprising a first holder for one of said parts, a second holder for the other of said parts, means for rotating said first holder, means for yieldably reacting against torque applied to said second holder, a cylindrical drum for supporting record material, means supporting said drum to rotate as a unit with said second holder, a carrier for maintaining a scriber in scribing relation to the periphery of said drum, and means operable by said rotating means for moving said carrier along the length of said drum.

10. In a device for measuring the torque required to rotate one part in screw threaded relation to another part; the combination comprising a first holder for one of said parts, a second holder for the other of said parts, means for rotating said first holder, a movable support for rotatably supporting said first holder, means for moving said support to carry said first holder from a loading position to a measuring position relative to said second holder, means for yieldably reacting against torque applied to said second holder, a cylindrical drum for supporting record material, means supporting said drum to rotate as a unit with said second holder, a carrier for maintaining a scriber in scribing relation to the periphery of said drum, a cam carried by said holder support and operable by said rotating means, and cam follower means operable by said cam when said support is in said measuring position for moving said carrier axially relative to said drum.

11. In a device for measuring the torque required to rotate one part in screw threaded relation to another part; the combination comprising a first holder for one of said parts, a second holder for the other of said parts, means for rotating said first holder, a movable support for rotatably supporting said first holder, means for moving said support to carry said first holder from a loading position to a measuring position relative to said second holder, means for yieldably reacting against torque applied to said second holder, a cylindrical drum for supporting record material, means supporting said drum to rotate as a unit with said second holder, a carrier for maintaining a scriber in scribing relation to the periphery of said drum, a cam carried by said holder support and operable by said rotating means, cam follower means operable by said cam only when said support is in said measuring position for moving said scriber support along the length of said drum, and means responsive to movement of said support between said measuring position and said loading position for rotating said drum relative to said second holder and said scriber from one recording station to another.

12. In a device for measuring the torque required to rotate one part in screw threaded relation to another part; the combination comprising a first holder for one of said parts, a second holder for the other of said parts, means for rotating said first holder, means for yieldably reacting against torque applied to said second holder, a cylindrical drum for supporting record material, means operatively connecting said drum to said second holder to rotate in unison therewith, a carrier for maintaining a scriber in scribing relation to the periphery of said drum, means operable by said rotating means for moving said carrier along the length of said drum, and means operable as an incident to rotation of said first holder by a predetermined amount for arresting said rotating means.

13. In a device for measuring the torque required to rotate one part in screw threaded relation to another part; the combination comprising a first holder for one of said parts, a second holder for the other of said parts, means for rotating said first holder in either of opposite directions, means for yieldably reacting against torque applied to said second holder, a cylindrical drum for supporting record material, means operatively connecting said drum to said second holder whereby to rotate said drum in unison therewith, a carrier for maintaining a scriber in scribing relation to the periphery of said drum, means controlled by said rotating means during rotation thereof in one direction for moving said carrier in one direction along the length of said drum, said last mentioned means being controlled by said rotating means during rotation thereof in the opposite direction for moving said carrier in the opposite direction along the length of said drum, and means operable as an incident to rotation of said first holder by a predetermined amount in either direction for arresting said rotating means.

WILLIAM H. PETIT.

REFERENCES CITED

The following references are of record in the file of this patent:

UNITED STATES PATENTS

| Number | Name | Date |
| --- | --- | --- |
| 2,216,563 | Cartier | Oct. 1, 1940 |
| 2,279,698 | Weckerly | Apr. 14, 1942 |
| 2,337,951 | Whitehead | Dec. 28, 1943 |
| 2,441,608 | Warner | May 18, 1948 |
| 2,486,632 | Burke et al. | Nov. 1, 1949 |